Jan. 5, 1971    A. PISCHINGER ET AL    3,552,146
DEVICE FOR ADJUSTING THE BEGINNING OF FUEL
INJECTION OF AN INJECTION PUMP
Filed Dec. 17, 1968    2 Sheets-Sheet 1

INVENTORS
A. PISCHINGER
M. HAUBENHOFER
BY Holman, Glascock,
Downing + Seebold

ATTORNEYS

United States Patent Office 3,552,146
Patented Jan. 5, 1971

3,552,146
DEVICE FOR ADJUSTING THE BEGINNING OF FUEL INJECTION OF AN INJECTION PUMP
Anton Pischinger and Max Haubenhofer, Graz, Austria, assignors to Friedmann & Maier, Hallein, near Salzburg, Austria, a corporation of Austria
Filed Dec. 17, 1968, Ser. No. 784,408
Claims priority, application Austria, Dec. 22, 1967, A 11,643/67
Int. Cl. F16d 5/00; F16h 35/08
U.S. Cl. 64—25                  3 Claims

ABSTRACT OF THE DISCLOSURE

A device for adjusting the beginning of fuel injection of an injection pump in which the driving torque is transmitted from a coupling via an axially movable sleeve to a second coupling, with the teeth of one coupling having a pitch different from the teeth of the other coupling and an adjusting device cooperates with the sleeve to move the axially movable sleeve whereby the relative angular position of both couplings is altered. At least the driving flanks of the teeth of one coupling are inclined relative to the radial direction to such an extent that upon transmitting the driving torque by the couplings frictional forces are developed which in total are equal to or greater than the thrust component generated in view of the bevel gearing of one of the couplings.

BACKGROUND OF THE INVENTION

The invention relates to a device for adjusting the beginning of a fuel injection of an injection pump for internal combustion engines, in which the driving torque for the injection pump is transmitted from a coupling via an axially movable coupling sleeve to a second coupling the teeth of one coupling being arranged with a pitch different from the pitch of the teeth of the other coupling, and, by axially removing the coupling sleeve by means of an adjusting device, the relative angular position of both couplings is altered. The driving torque to be transmitted via a coupling sleeve is subjected to great variations and attains its highest value during fuel injection.

Such known devices of the type above defined suffer from the disadvantage that in the bevel gearings forces are generated which act on the coupling sleeve in an axial direction. In such embodiments where the coupling sleeve is axially moved by means of an automatic actuating device, for example by spring-loaded centrifugal weights, the coupling sleeve forms, together with the actuating device, a structure susceptible to oscillations, being brought to oscillation by the axial forces. Now, oscillations of the coupling sleeve have, in a quite disadvantageous manner, as a consequence, a rapid wear of the engaging gears and an intolerable maladjustment of the coupling sleeve from its desired position.

The invention proposes to remove the mentioned disadvantages and essentially consists in that the flanks of the teeth of at least one of the couplings are arranged such that when transmitting the driving torque by means of the couplings, within the gearings frictional forces are generated, which in total are equal to or greater than the thrust component generated in view of the bevel gearing. With this arrangement, the coupling sleeve is, at least during the period of fuel injection, not subjected to axial forces, and, one can speak of a temporary self-arresting of the coupling sleeve.

SUMMARY OF THE INVENTION

An advantageous solution of the problem according to the invention consists in that at least the driving flanks of at least the teeth of one coupling are inclined relative to the radial direction to such an extent that when transmitting the driving torque by means of the couplings, frictional forces are generated, which in total are equal to or greater than the thrust component generated in view of the bevel gearing. According to a further development of the invention, the device for adjusting the beginning of the fuel injection is designed such that the driving flanks of the teeth of only one coupling are inclined relative to the radial direction to such an extent that when transmitting the driving torque by means of the couplings, frictional forces are generated which, in total, are equal to or greater than the thrust component generated in view of the bevel gearing. Such an adjustment device of the type indicated is of special advantage if the coupling provided with the strongly inclined flanks of the teeth has the form of a spur gear.

A possibility of particular advantage consists in the combination of the features according to the invention with injection pumps provided with at least two outlets, in which injection pumps the arrangement of the cams and the form of the active flanks is such that when one pump piston is exerting its injection stroke, the other pump piston is retracted so that when rotating the cam shaft there is a range of angular positions of the cam shaft, within which no driving torque or only a small driving torque for the injection pump is necessary.

Devices for adjusting the beginning of the fuel injection of the injection pump have already been proposed, the couplings of which show evolvent gearings engaging one another, seen in a normal section, with an angle of 30°. The maximal length at disposal and the required range of angular adjustment, however, result in a pitch angle of the teeth of the gearings, which makes it impossible to obtain a coupling sleeve with self-arresting properties. The coupling sleeve is further subjected to oscillations of great amplitude, which results in a rapid, heavy wear.

The invention is further illustrated with reference to the drawing in which an embodiment of a device for adjusting the beginning of fuel injection is schematically illustrated.

Figure 1:
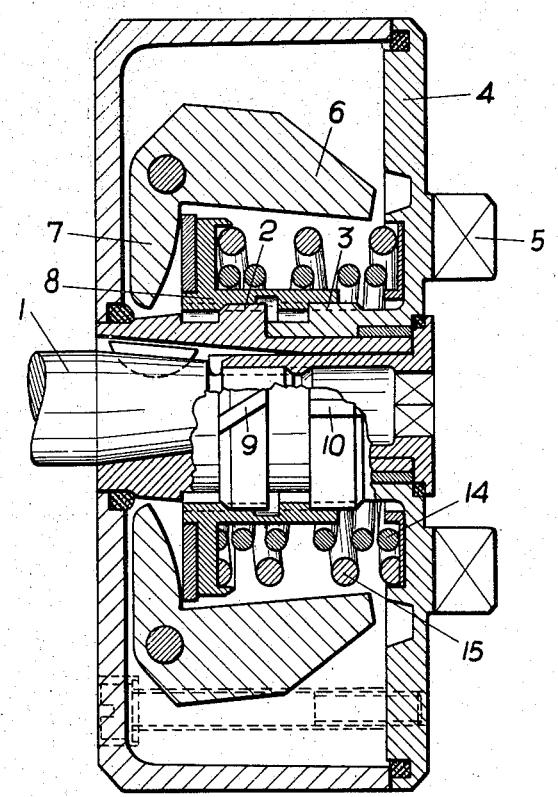
FIG. 1 is a partial longitudinal section through a device of the invention for adjusting the injection instant.

According to FIG. 1, to a shaft 1 of the injection pump a coupling 2 is fixed by means of a wedge or the like. Coaxial with the coupling 2, a second coupling 3 is arranged for rotary adjustment relative to the first coupling 2, and is fixed to a disc 4, or is integral therewith, respectively. Driving torque is supplied to the shaft 1 of the injection pump via a dog clutch 5. A coupling sleeve 8 is acted upon by fingers 7 of centrifugal weights 6 and thereby, in dependence on the revolution speed, moved in an axial direction against the action of coil springs 14 and 15. The coupling sleeve 8 is provided with teeth cooperating with the couplings 2 and 3. Teeth 9 and 10, respectively, of the couplings 2 and 3, respectively, are arranged with a different pitch so that by axially moving the coupling sleeve, the coupling 2 is rotated relative to the coupling 3 and, thereby, also the shaft 1 is rotated relative to the driving disc 4.

Figure 2:
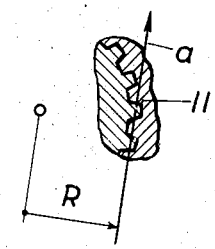
FIG. 2 shows the teeth of a known coupling.
Figure 3:
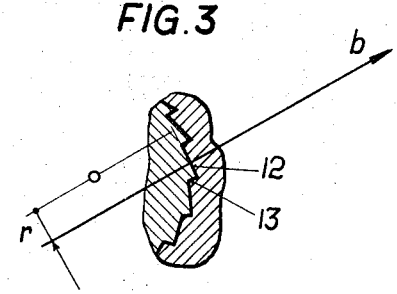
FIG. 3 shows the teeth of a coupling according to the invention.

Until now the couplings were manufactured in the manner as usual for cog wheels. Thus, the form of the teeth of such known couplings was as shown in FIG. 2, with the circumferential force thus acting in a vertical direction $a$ to tooth flanks 11 at the graduated circle. In this known arrangement, radius R, at which the circumferential force is active, approximately corresponds to the radius of the graduated circle. Now, according to the invention, a tooth form can be selected as is, for example, shown in FIG. 3. With this arrangement, the direction of a vertical line $b$ onto tooth flanks 12 is such that radius $r$ is much smaller than the graduated circle for the teeth. With such an arrangement, the circumferential force necessary for transmitting the torque in the desired direction of rotation, is materially increased at the tooth flanks, as compared to the torque at the teeth of couplings provided with teeth of the known form. The increase of the circumferential force has, as a consequence, an increase of friction forces on the tooth flanks, so that during each fuel injection complete security is obtained against maladjustment of the relative position of the couplings 2 and 3 and in response to reaction forces produced by the fuel injection (self arresting). By suitably selecting the radius $r$, frictional forces of the desired strength can be produced within a wide range.

According to the embodiment shown in FIG. 1, the coupling 3 has a gearing similar to a spur gear and the coupling 2 a gearing like a bevel gear. However, it is possible for the coupling 3 to be in the form of a bevel gear and the coupling 2 in the form of a spur gear. It is further possible for both coupling 2 and 3 to have the form of bevel gears of different pitch and/or different pitch direction. However, the first mentioned embodiment in which one coupling has a gearing like a spur gear and the other a spiral gear, has proved convenient from the standpoint of manufacturing facility. For achieving the above mentioned self-arresting, it is sufficient to provide only a single coupling with a gearing according to the invention and, based on this finding, it has proved advantageous to give only the teeth of the gear, having the form of the spur gear, the form according to the invention.

Figure 4:
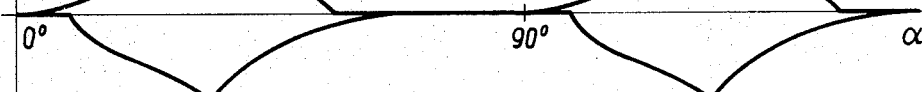
FIG. 4 illustrates the torque characteristic in dependence on the relative position of the couplings, for a four-piston injection pump.
Figure 5:
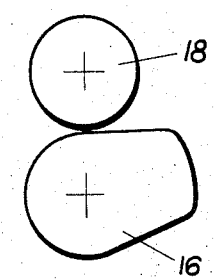
FIG. 5 represents two cam positions.
Figure 5:
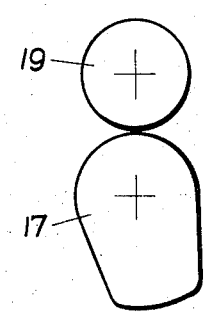

As is illustrated in FIG. 4, the driving torque being influenced by a cam, for the injection pump fluctuates between a high value $c$, as produced during fuel injection when lifting the cam roller of an injection piston, and a slightly negative value $d$, as produced when retracting the respective piston by a retracting spring. According to a further advantageous embodiment of the invention, with injection pumps provided with at least two outlets, the arrangement of the cams and the form of their active flanks is such that when lifting one pump piston by means of its respective cam roller 18, another pump piston is allowed by the cam roller 19 to retract. With this arrangement when rotating the cam shaft there are angular positions of the cam shaft at which no driving torque or only a small driving torque is necessary for the injection pump with the angular positions lying within an angle of revolution of the cam shaft of substantial extent. FIG. 4 illustrates the input torque in dependence on the angle of revolution and clearly shows that with a cam form according to FIG. 5 angular positions of the cam shaft are possible in which no driving torque is required. Within the angular positions requiring no or only small driving torque no retracting forces derived from the axial component, are acting on the coupling sleeve and further no frictional forces need be overcome within the gearings of the couplings 2 and 3. The coupling sleeve can, therefore, be shifted with only little forces.

What we claim is:

1. A device for adjusting the beginning of fuel injection of an injection pump for internal combustion engines in which the driving torque for the injection pump is transmitted from a coupling having teeth via an axially movable coupling sleeve to a second coupling having teeth, the teeth of one coupling having a pitch different from the pitch of the teeth of the other coupling, one of said couplings having a bevel gearing and an adjusting device cooperable with the sleeve for axially moving the coupling sleeve whereby the relative angular position of both couplings is altered, the improvement being that at least the driving flanks of at least the teeth of one coupling are inclined relative to the radial direction to such an extent that upon transmitting the driving torque by means of the couplings, frictional forces are generated, which in total are equal to or greater than the thrust component generated in view of the bevel gearing.

2. The device as claimed in claim 1, in which the driving flanks of the teeth of only one coupling are inclined relative to the radial direction to such an extent that when transmitting the driving torque by means of the couplings, frictional forces are generated, which in total are equal to or greater than the thrust component generated in view of the bevel gearing.

3. The device as claimed in claim 2, in which the coupling provided with strongly inclined driving flanks of the teeth, is in the form of a spur gear.

References Cited

UNITED STATES PATENTS

| 2,793,514 | 5/1957 | Schmitt | 64—25 |
| 3,174,303 | 3/1965 | Watson | 64—25 |
| 3,258,937 | 7/1966 | Kranc et al. | 64—25 |
| 3,424,875 | 1/1969 | Ojala | 64—25X |

LEONARD H. GERIN, Primary Examiner

U.S. Cl. X.R.

74—402